United States Patent
Messman et al.

(10) Patent No.: US 11,512,201 B2
(45) Date of Patent: *Nov. 29, 2022

(54) THIXOTROPIC POLYSILOXANE PASTES FOR ADDITIVE MANUFACTURING

(71) Applicant: Honeywell Federal Manufacturing & Technologies, LLC, Kansas City, MO (US)

(72) Inventors: Jamie Michael Messman, Leawood, KS (US); Steven Michael Patterson, Kansas City, MO (US); Petar Dvornic, Midland, MI (US); Alisa Zlatanic, Dexter, MI (US); James Beach, Pittsburg, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,486

(22) Filed: May 11, 2021

(65) Prior Publication Data

US 2022/0251384 A1 Aug. 11, 2022

Related U.S. Application Data

(63) Continuation of application No. 17/192,197, filed on Mar. 4, 2021.

(60) Provisional application No. 63/147,985, filed on Feb. 10, 2021.

(51) Int. Cl.
*C08L 83/04* (2006.01)

(52) U.S. Cl.
CPC .................................. *C08L 83/04* (2013.01)

(58) Field of Classification Search
CPC ........................................................ C08L 83/04
See application file for complete search history.

(56) References Cited

U.S. PATENT DOCUMENTS

| 4,670,531 A * | 6/1987 | Eckberg | C08L 83/04 528/21 |
| 9,714,344 B2 | 7/2017 | Mayumi et al. | |
| 10,100,192 B2 | 10/2018 | Zhou et al. | |
| 10,155,884 B2 | 12/2018 | Kenney et al. | |
| 2019/0264046 A1 | 8/2019 | Velev et al. | |
| 2020/0308428 A1 * | 10/2020 | Perez | C09D 11/102 |

FOREIGN PATENT DOCUMENTS

| EP | 3321074 | 5/2018 | |
| WO | 2019/193961 | 10/2019 | |
| WO | 2020/051039 | 3/2020 | |
| WO | 2020/082359 | 4/2020 | |
| WO | WO2021134433 A1 * | 8/2021 | C08G 77/20 |

OTHER PUBLICATIONS

Beach, J., et al.; Macromolecules, vol. 54, p. 1715-1724, published Feb. 9, 2021.*
Zlatanic, A., et al.; Macromolecules, 2017, vol. 50, p. 3532-3543.*
Machine Translation of WO2019/193961, 45 pages.
Ibemesi et al., "Synthesis of Block Copolymers of Methyl Siloxane, Phenyl Siloxane, Vinyl Siloxane, Etc.," Lawrence Livermore Laboratory, University of California, Jun. 30, 1979, 7 pages.
Durban et al., "Custom 3D Printable Silicones with Tunable Stiffness," Macromol. Rapid Commun. 2017, 1700563, 6 pages.
Durban et al., Supporting Information for "Custom 3D Printable Silicones with Tunable Stiffness," Macromol. Rapid Commun. 2017, 1700563, 7 pages.
Ortiz-Acosta et al., "3D-Printed Silicone Materials with Hydrogen Getter Capability," Adv. Funct. Mater. 2018, 28, 1707285, 8 pages.
Ortiz-Acosta et al., Supporting Information for "3D-Printed Silicone Materials with Hydrogen Getter Capability," Adv. Funct. Mater. 2018, 28, 1707285, 5 pages.

* cited by examiner

Primary Examiner — Robert S Jones, Jr.
(74) Attorney, Agent, or Firm — Hovey Williams LLP

(57) ABSTRACT

Shelf-stable, rapid crosslinking, "all-in-one" pastes useful as "inks" in additive manufacturing are provided. These pastes exhibit desirable rheological flow properties and crosslinking upon exposure to UV light. The pastes are based on vinylsilyl-functionalized, completely amorphous, linear terpolysiloxanes containing predominantly dimethylsiloxy-repeat units with small amounts of diphenylsiloxy-, methylphenylsiloxy-, diethylsiloxy-, and/or methyltrifluoroalkylsiloxy-crystallization disruptors. The base polymers are preferably compounded with a trimethylsilylated-hydrophobic silica filler, thixotropic flow agent, hydrosilyl-functionalized oligomeric crosslinker, and a catalytic system comprising platinum(II) acetylacetonate or trimethyl(methylcyclopentadienyl)-platinum(IV), and diethyl azodicarboxylate.

15 Claims, 8 Drawing Sheets

THIXOTROPIC POLYSILOXANE PASTES FOR ADDITIVE MANUFACTURING

RELATED APPLICATIONS

The present application is a continuation application of pending U.S. patent application Ser. No. 17/192,197, filed Mar. 4, 2021, entitled THIXOTROPIC POLYSILOXANE PASTES FOR ADDITIVE MANUFACTURING, incorporated by reference in its entirety herein. The '197 application claims the priority benefit of U.S. Provisional Patent Application Ser. No. 63/147,985 filed Feb. 10, 2021, entitled THIXOTROPIC POLYSILOXANE PASTES FOR ADDITIVE MANUFACTURING, incorporated by reference in its entirety herein.

STATEMENT REGARDING FEDERALLY SPONSORED RESEARCH OR DEVELOPMENT

This invention was made with Government support under Contract No. DE-NA-0002839, awarded by the United States Department of Energy/National Nuclear Security Administration. The Government has certain rights in the invention.

BACKGROUND

Field

The present disclosure relates to compositions useful in additive manufacturing processes.

DESCRIPTION OF RELATED ART

Additive manufacturing, also referred to as 3D printing, has become a popular technological platform for computer-assisted design and rapid manufacturing. Among various printing techniques developed, extrusion has become increasingly popular because of easily available and relatively inexpensive equipment as well rather simple operating procedures. Of the polymers for use as printing "inks" in extrusion-based additive manufacturing, thermoplastics that conveniently melt above room temperature and quickly solidify upon cooling to room temperature still dominate the field, although elastomers for this purpose have started to find use more recently. Among the latter, various types of polysiloxanes have attracted attention because of the thermal, surface, biomedical, and permeation properties of silicone rubbers.

The difficulty with elastomers for additive manufacturing, however, arises from their characteristic low glass and melting temperatures, which create the need to suitably combine two main processing requirements: an appropriate rheology for the material's flow through a printer/extruder; and quick, efficient, and permanent fixing of the shape of the printed object. In practice, this can be achieved by: (a) formulating elastomer "inks" into thixotropic pastes that flow like liquids above certain yield stress to which they are exposed in the printer/extruder but assume and retain (at least temporarily) their shapes after the stress is released, and (b) designing the composition so that it can be quickly and efficiently covalently crosslinked (cured without support) in air after the deposition from an extruder's die/nozzle.

For the latter, hydrosilylation crosslinking chemistry is appealing because it can be controlled, is reproducible, and does not incorporate into the crosslinked polysiloxane any additional structural units that may become weak links capable of disturbing properties of the resulting rubbers in both low and high temperature applications. A problem with hydrosilylation, however, is that when the crosslinking components are mixed together with necessary catalyst(s), the reaction readily commences and progresses relatively quickly. As a result, these formulations must be produced as two-part systems in which the catalyst is dispersed in only one of the crosslinking components, with the two parts being mixed together in appropriate proportions at the application location immediately prior to use, resulting in curing mixtures with very limited, short lifetimes. This clearly represents a problem for printers, where having "inks" with long shelf lives, ready to go when desired without the need for any additional manipulations (such as addition of other chemicals at the location) would be highly preferable.

Thus, there is a need for an "all-in-one" composition that has a long shelf life and provides convenient rheological flow through the extruder as well as quick, reliable, and permanent 3D crosslinking of printed shapes after exiting the extruder die.

SUMMARY

In one embodiment, the present disclosure is broadly concerned with a method of forming a three-dimensional structure, where the method comprising one or more of the following:
(i) curing a first composition to form a first layer, with the first composition comprising at least 50% by weight of a polymer that comprises the following monomers:

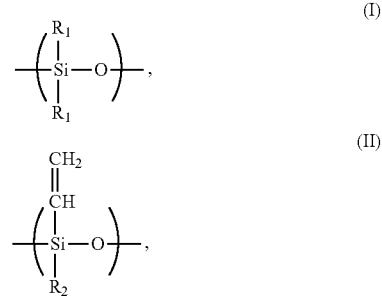

and
a crystallization disruptor monomer comprising:

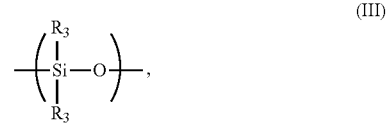

where:
  each $R_1$ can be the same or different and is chosen from alkyls and fluoroalkyls;
  $R_2$ is chosen from alkyls; and
  each $R_3$ can be the same or different and is chosen from phenyl, alkyls, and fluoroalkyls, wherein at least one $R_3$ is phenyl, ethyl, or a fluoroalkyl;
(ii) curing a second composition to form a second layer on the first layer, wherein the first and second compositions can be the same as or different from one another; and (iii) repeating (ii) one or more times with further compositions that can be the same as the first composition or different from the first composition so as to form one or more additional layers, wherein (ii) or (iii) results in the formation of the three-dimensional structure.

The disclosure is also concerned with the three-dimensional structures formed by the above method.

Finally, the disclosure provides a composition useful in additive manufacturing methods. The composition comprises:

at least 50% by weight of a polymer that comprises the following monomers:

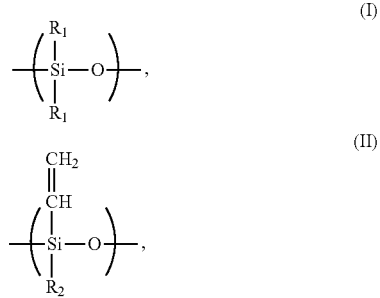

and
a crystallization disruptor monomer comprising:

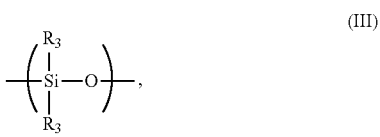

where:
each $R_1$ can be the same or different and is chosen from alkyls and fluoroalkyls;
$R_2$ is chosen from alkyls; and
each $R_3$ can be the same or different and is chosen from phenyl, alkyls, and fluoroalkyls, wherein at least one $R_3$ is phenyl, ethyl, or a fluoroalkyl;
a crosslinker;
a thixotropic additive; and
one or more of a catalyst, a catalyst inhibitor, or a filler.

DETAILED DESCRIPTION

Figure 1:
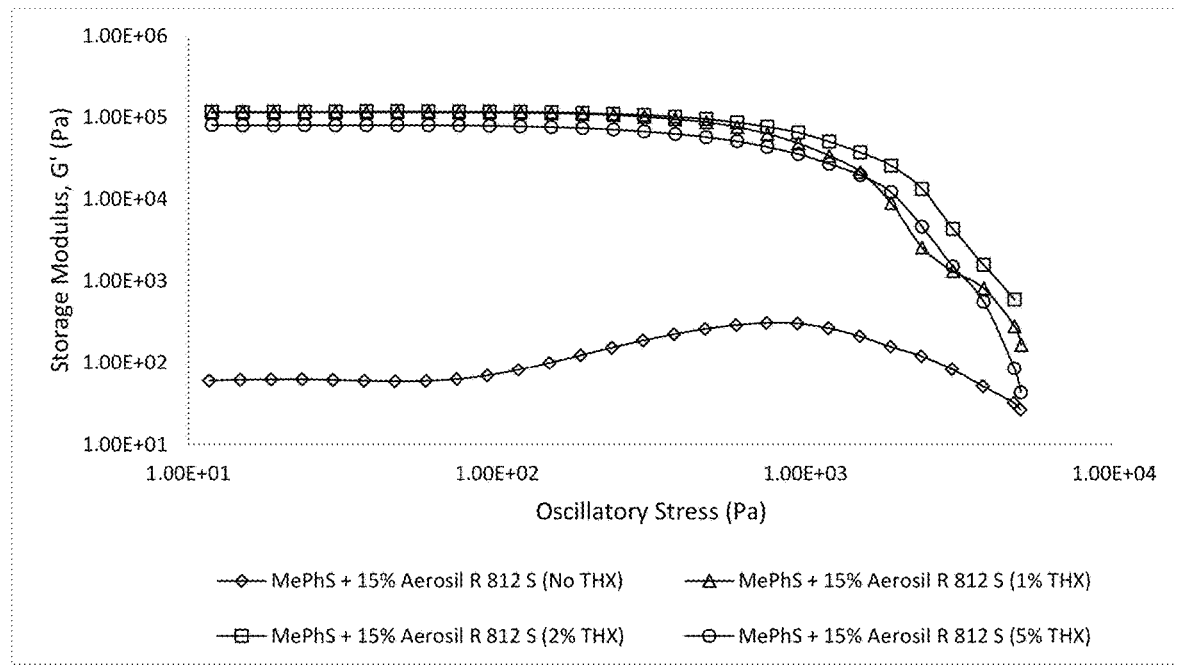
FIG. 1 is a graph of the oscillatory shear of pastes containing 15 wt. % AEROSIL® R 812 S in MePhS-containing terpolymer (B) and varying amounts of BLUESIL™ THIXO ADD 22646 ("THX") as described in Example 5.

The present disclosure provides polysiloxane compositions and methods of using those compositions in additive manufacturing. These compositions are preferably thixotropic, meaning they exhibit a decrease in viscosity with increasing shear, and the viscosity will return as the shear decreases.

Polysiloxane Compositions

1. Polymers for Use in Compositions

Polymers for use in the compositions are preferably vinylsilyl-functionalized polysiloxanes. The polymers are preferably linear, although they can be branched in some embodiments, or even a mixture of branched and linear. The polymers are also preferably substantially or completely amorphous, telechelic, and/or dimethylvinylsilyl-terminated.

In a preferred embodiment, the polymer comprises the following repeat units:

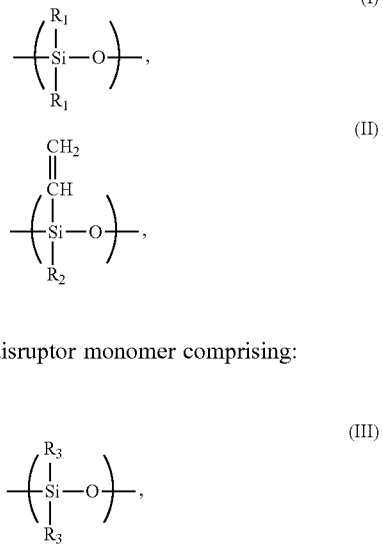

a crystallization disruptor monomer comprising:

where:
  each $R_1$ can be the same or different and is chosen from alkyls (preferably $C_1$ to about $C_{14}$, more preferably $C_1$ to about $C_6$ and even more preferably $C_1$ to about $C_3$), fluoroalkyls (preferably $C_1$ to about $C_{14}$, more preferably $C_1$ to about $C_6$, and even more preferably $C_1$ to about $C_3$), and hydroxyl;
  $R_2$ is chosen from alkyls (preferably $C_1$ to about $C_{14}$, more preferably $C_1$ to about $C_6$, and even more preferably $C_1$ to about $C_3$); and
  each $R_3$ can be the same or different and is chosen from phenyl, alkyls (preferably $C_1$ to about $C_{14}$, more preferably $C_1$ to about $C_6$, and even more preferably $C_1$ to about $C_3$), and fluoroalkyls (preferably $C_1$ to about $C_{14}$, more preferably $C_1$ to about $C_6$, and even more preferably $C_1$ to about $C_3$), wherein at least one $R_3$ is phenyl, ethyl, or a fluoralkyl.

In one embodiment, each $R_1$ and $R_2$ is individually chosen from alkyls, while each $R_3$ is individually chosen from phenyl, alkyls, or a fluoralkyl. In a particularly preferred embodiment, each $R_1$ and $R_2$ is methyl (i.e., dimethylsiloxy and methylvinylsiloxy monomers, respectively), and (III) is chosen from one or more of:

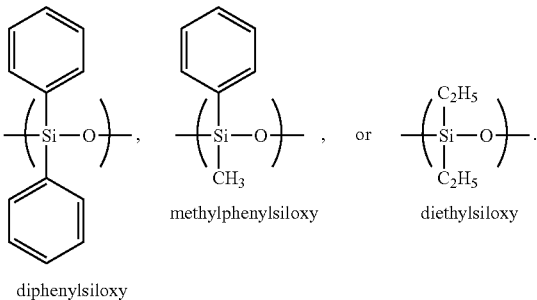

In one embodiment, the molar percentage of (I) in the polysiloxane is preferably from about 90% to about 98%, more preferably from about 93% to about 96%, and most preferably from about 95% to about 96%. The molar percentage of (II) is from about 0.1% to about 10%, preferably from about 0.1% to about 5%, more preferably from about 0.1% to about 2%, and even more preferably from about 0.3% to about 1%. The molar percentage of (III) is from about 2% to about 60%, preferably from about 2% to about 10%, more preferably from about 3% to about 9%, and even more preferably from about 3% to about 7%.

In embodiments where (III) is diphenylsiloxy, (III) is preferably present in the polymer at a molar percentage of about 1.5% to about 6%, more preferably about 2.5% to about 5%, and more preferably about 3.3% to about 4%. In embodiments where (III) is methylphenylsiloxy, (III) is preferably present in the polymer at a molar percentage of about 2% to about 8%, more preferably about 3% to about 6%, and more preferably about 4% to about 5%. In embodiments where (III) is diethylsiloxy, (III) is preferably present in the polymer at a molar percentage of about 3% to about 11%, more preferably about 5% to about 9%, and more preferably about 6.5% to about 7.5%.

In one embodiment, the polysiloxane consists essentially of (I), (II), and (III). In another embodiment, the polysiloxane consists of (I), (II), and (III) (i.e., the polysiloxane is a terpolymer).

The number average molecular weight (Mn) of the resulting polymer is preferably from about 10,000 g/mol to about 70,000 g/mol, more preferably from about 25,000 g/mol to about 45,000 g/mol, and even more preferably from about 28,000 g/mol to about 36,000 g/mol. The weight-average molecular weight (Mw) range of the polymer as measured by SEC-MALS-VIS (using a Visco-Star II online detector) is from about 25,000 g/mol to about 85,000 g/mol, more preferably from about is 40,000 g/mol to about 65,000 g/mol, and even more preferably from about 45,000 g/mol to about 60,000 g/mol.

2. Polymerization Materials and Methods

The above-described terpolymers can be prepared according to known polymerization methods. One preferred method comprises anionic ring opening/equilibration polymerization of the corresponding mixtures of cyclosiloxanes, as carried out in Example 2 below and as described by the following, each incorporated by reference:
  i. A. Zlatanic, D. Radojcic, X. Wan, J. M Messman, P. R. Dvornic, Suppression of Crystallization in Polydimethylsiloxanes and Chain Branching in Their Phenyl-containing Copolymers, Macromol. 50 (2017) 3532-3543;
  ii. A. Zlatanic, D. Radojcic, X. Wan, J. M. Messman, P. R. Dvornic, Monitoring of the Course of the Silanolate-Initiated Polymerization of Cyclic Siloxanes. A Mechanism for the Copolymerization of Dimethyl and Diphenyl Monomers, Macromol. 51 (2018) 895-905; and iii. A. Zlatanic, D. Radojcic, X. Wan, J. M. Messman, D. E. Bowen, P. R. Dvornic, Dimethyl-Methylphenyl Copolysiloxanes by Dimethylsilanolate-Initiated Ring Opening Polymerization. Evidence for Linearity of the Resulting Polymer Structures. *J. Pol. Sci., Part A: Pol. Chem.* 57(10) (2019) 1122-1129, https://doi.org/1.002/pola.29367.

3. Composition Preparation

The compositions according to this disclosure are prepared by mixing the polymer described above with the other components until substantially uniformly mixed. Alternatively, the composition can be prepared by mixing all ingredients except the filler, followed by successive addition and mixing of small portions of filler until all filler has been added, followed by further mixing until substantially uniformly mixed. Advantageously, because the compositions are shelf-stable, this composition can be provided as an "all-in-one" composition rather than a two-part system whose two parts must be stored separately and then mixed immediately at use.

The composition comprises one or more of the following a crosslinker, a thixotropic additive, a catalyst, a catalyst inhibitor, and/or a filler. The above-described polysiloxane will preferably be present in the composition at a level of at least about 50% by weight, and more preferably about 50% to about 75% by weight, based upon the total weight of the composition taken as 100% by weight.

Preferred crosslinkers are hydrosilylation crosslinkers, with preferred such crosslinkers including a methylhydridosiloxane-dimethylsiloxane copolymer. Examples of other suitable hydrosilylation crosslinkers include those chosen from HMS-151 (15-18% methylhydridosiloxane and trimethylsiloxane terminated; by Gelest, Inc.), HMS-301 (25-35% methylhydridosiloxane and trimethylsiloxane terminated; by Gelest, Inc.), HMS-H271 (25-30% methylhydridosiloxane and hydride terminated; by Gelest, Inc.), and mixtures thereof.

In one embodiment, the polysiloxane and crosslinker are provided at levels that correspond to a [Si—H]:[Si-Vi] molar ratio of from about 0.5:1 to about 1.5:0, preferably from about 0.5:1 to about 1.5:0.1, more preferably from about 0.5:1 to about 1.5:1, and even more preferably about 1:1.

Preferred thixotropic additives include those having a polydimethylsiloxane main chain backbone and poly(ethyl ether-co-propyl ether) pendant chains ending in carbinol end groups, methylether end groups, or both. One thixotropic additive meeting this description is sold under the name BLUESIL™ THIXO ADD 22646 (from Elkem Silicones). Additional thixotropic additives suitable for use in the compositions according to the disclosure include one or more of Thixo Agent AC (CHT, USA/Quantum Silicones), DMS-H11 (hydride terminated polydimethylsiloxane; Gelest, Inc.), PLY-906 (NuSil), and Alumilite Thixotropic Additive (Alumilite Corporation). It is preferred that the thixotropic additive is present in the composition at levels of about 0.1% by weight to about 5% by weight, more preferably about 0.5% by weight to about 3% by weight, and even more preferably about 0.5% by weight to about 1.5% by weight, based on the total weight of the composition taken as 100% by weight.

Preferred catalysts are hydrosilylation catalysts, with a transition metal (e.g., platinum, rhodium, ruthenium, palladium, nickel, iron, iridium) catalyst being particularly preferred. Such catalysts include platinum(II) acetylacetonate, trimethyl(methylcyclopentadienyl)-platinum(IV) and other UV-active hydrosilylation catalysts, such as those disclosed by Lukin, Ruslan Yu et al., "Platinum-Catalyzed Hydrosilylation in Polymer Chemistry." *Polymers* 12, 2174 (2020), incorporated by reference herein. It is preferred that the catalyst is present in the composition at levels of about 0.0005% by weight to about 1% by weight, more preferably about 0.00075% by weight to about 0.5% by weight, and even more preferably about 0.001% by weight to about 0.2% by weight, based on the total weight of the composition taken as 100% by weight.

Although not required, in certain embodiments a catalyst inhibitor is also included in the composition. Preferred catalyst inhibitors have a long pot life and sharp onset cure, and will also complex with the catalyst to successfully inhibit the catalyst at room temperature during molding or storage. Alkynes and alkenes with electron-withdrawing substituents are particularly preferred for use as the catalyst inhibitor. Maleates and fumarates are particularly well-suited for this role. Examples include those chosen from diethyl azodicarboxylate, 1-ethynylcyclohexanol dimethyl maleate, diallyl maleate, dimethyl maleate, and dimethyl fumarate. Other suitable inhibitors are discussed by Lukin, Ruslan Yu et al., "Platinum-Catalyzed Hydrosilylation in Polymer Chemistry." *Polymers* 12, 2174 (2020), previously incorporated by reference.

It is preferred that the catalyst inhibitor is present in the composition at levels of about 0% by weight to about 1.5% by weight, more preferably from about 0.01% by weight to about 1.5% by weight, even more preferably about 0.02% by weight to about 1.0% by weight, and most preferably about 0.05% by weight to about 0.75% by weight, based on the total weight of the composition taken as 100% by weight.

The catalyst and catalyst inhibitor can be provided individually, or they can be delivered together as part of a "catalyst system" that preferably includes a carrier (e.g., 1,3-dioxolane) for the two components. The molar ratio of catalyst inhibitor to catalyst is preferably from about 0.25:1 to about 4:1, and more preferably 1:1 to about 4:1.

Preferred fillers for use in the composition include silica (preferably fumed), montmorillonite, carbon black, zinc oxide, titanium dioxide, carbon nanotubes, graphene/reduced graphene oxide, and mixtures thereof. A particularly preferred filler is a trimethylsilylated fumed silica such as that sold under the name AEROSIL® R 812 S (Evonik, Olmstead, Ohio). It is preferred that the filler is present in the composition at levels of about 6% by weight to about 24% by weight, more preferably about 8% by weight to about 20% by weight, and even more preferably about 10% by weight to about 18% by weight, based on the total weight of the composition taken as 100% by weight.

Although a solvent is not required in the compositions according to the disclosure, one could be present (in addition to any carrier for the catalyst and catalyst inhibitor). In other embodiments, the composition does not include any solvent other than the carrier, and in some instances does not include any solvent or the carrier. Thus, solvent levels of the composition are preferably less than about 50% by weight, more preferably less than about 25% by weight, even more preferably less than about 5% by weight, and even more preferably about 0% by weight, based upon the weight of the composition taken as 100% by weight.

In one embodiment, the composition consists essentially of, or even consists of, the polysiloxane, crosslinker, thixotropic additive, catalyst, catalyst inhibitor, and filler.

In another embodiment, it is preferred that the composition comprise little to no polycarbonates. That is, the composition will comprise less than about 10% by weight polycarbonates, preferably less than about 5% by weight polycarbonates, more preferably less than about 1% by weight polycarbonates, and more preferably about 0% by weight polycarbonates, based on the total weight of the composition taken as 100% by weight.

4. Composition Properties

Regardless of the embodiment, the composition will possess rheological properties (determined as defined in Example 4) making it highly useful in additive manufacturing, including a high storage modulus and high shear stress. Also, this behavior remains unchanged for a month or more of storage at room temperature, particularly when stored in the dark. For example, the compositions will preferably have yield stresses of about 1,000 Pa to about 3,500 Pa, and preferably about 1,300 Pa to about 2,400 Pa (if G'/G" intersect was used).

Additionally, the paste compositions described herein will rapidly crosslink when exposed to electromagnetic radiation (e.g., UV light at about 315 to about 400 nm; IR radiation from about 700 nm to about 1 mm) but will exhibit little to no crosslinking for some amount of time in ambient light or dark conditions. For example, upon exposure to electromagnetic radiation, the compositions will crosslink (i.e., paste tackiness disappears—greater than 95% gel content) within about 200 seconds, preferably within about 140 seconds, and more preferably within about 120 seconds. Furthermore, in ambient light (e.g., typical laboratory light), the compositions will show no visible signs of crosslinking (e.g., no signs of tackiness upon contact with a tongue depressor or similar rigid object) for at least about 4 days, preferably at least about 6 days, and more preferably at least about 10 days. Finally, in a dark environment, the compositions will show no visible signs of crosslinking for at least about 30 days, preferably at least about 3 months, more preferably at least about 6 months, and even more preferably at least about 9 months. All of the foregoing is obtained at room temperature (i.e., about 20° C. to about 25° C.).

Methods of Using the Compositions

The paste compositions described herein can be used in additive manufacturing, which is a process of generating a three-dimensional structure or object by sequential addition of layers of material or by joining of material layers or parts of material layers to form those structures. "3D printing" refers to a type of additive manufacturing where the "ink" or composition of which the structure three-dimensional structure will be made is deposited using a nozzle or other printer technology. "3D printer" refers to equipment used for 3D printing.

The disclosed composition is suitable for use in any available additive manufacturing machine technologies but particularly in those that benefit from the use of an elastomeric material, including material extrusion (where "ink" is dispensed through a nozzle or orifice) and/or material jetting (where droplets or material are deposited to build the layers). These are often referred to as "Direct Ink Write" ("DIW") processes.

In embodiments where material extrusion or material jetting is to be utilized, the composition disclosed herein will be dispensed "as received" (i.e., no mixing of components or parts right before dispensing) through a conventional 3D printer nozzle on a printer head that moves around the area to be printed, under the control and direction of conventional 3D software. The material is deposited in a very thin layer (e.g., less than about 400 microns, or less than about 200 microns, or less than about 100 microns, or less than about 50 microns) in the desired pattern for that layer. During this application, electromagnetic radiation, preferably in the form of UV light at a wavelength of about 315 nm to about 400 nm, is applied to the composition, which initiates crosslinking by hydrosilylation of the polysiloxane in the composition. As described previously, this crosslinking is essentially instantaneous—as quick as about 20-30 seconds—under these conditions and does not require a second or different cure step such as heat. In other words, the process is a single-cure process that can be carried out at room temperature (about 20° C. to about 25° C.) and without requiring the nozzle or orifice to be heated. Additionally, depending on the application, curing can take place in the air or on a support, thus a support is not required with the present process beyond the support on which printing is taking place (e.g., aluminum plate coated with polytetrafluoroethylene; glass plate).

The foregoing layer formation is repeated as many times as necessary and in the pattern necessary to form the desired three-dimensional object. It will be appreciated that each subsequent layer can be formed from the same composition as the first layer or, in situations where a multi-material object is desired, the composition can be switched as needed at any layer(s).

Because these polysiloxane compositions include all necessary components for both successful printing and subsequent crosslinking from the moment they are manufactured, perhaps their most significant advantage is that they are completely finalized/compounded at the manufacturing facility and delivered to the printer ready for use. No additional manipulation or handling is necessary (e.g., no component or processing aid need be added, as is required for traditional, two-part hydrosilylation crosslinking systems), only proper storage. More particularly, the present disclosure provides for a composition whose polymer, crosslinker, and catalyst can be combined at manufacturing and stored in that "ready-to-use" form. There is no need to separate the catalyst from one or both of the crosslinker and/or polymer. Thus, the composition is used or dispensed at least about 8 hours, preferably at least about 1 day, more preferably at least about a week, and even more preferably at least about a month after all of its components were mixed together. As a consequence of the foregoing, these "all-in-one" terpolysiloxane pastes are particularly useful in the additive manufacturing of high-quality silicone rubber parts for applications requiring exposures to temperatures as low as 100° C.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the disclosure. It is to be understood, however, that these examples are provided by way of illustration and nothing therein should be taken as a limitation upon the overall scope of the invention.

Example 1

Materials

The materials used in the following Examples were obtained from the sources described in this paragraph. Methylhydrido-co-dimethylsiloxane crosslinker ("MeHS" HMS-151; MW=1800-2000; 15-18% MeHS; average Si—H functionality of 4; trimethylsiloxy-terminated) was purchased from Gelest, Inc. (Morrisville, Pa.). BLUESIL™ THIXO ADD 22646 thixotropic additive was obtained from Elkem Silicones (East Brunswick, N.J.). Hexamethyldisilazane-treated (trimethylsilylated) AEROSIL® R 812 S fumed silica filler was purchased from Evonik (Olmsted, Ohio). Hydrosilylation catalysts platinum(II) acetylacetonate ("Pt(AcAc)$_2$") and trimethyl(methylcyclopentadienyl)-platinum(IV) ("MeCpPtMe$_3$") were purchased from Sigma Aldrich (St. Louis, Mo.). Diethyl azodicarboxylate, DEAD, was purchased from Alfa Aesar (Ward Hill, Mass.), and 1,3-dioxolane (99.5% stabilized) was purchased from Acros Organics (Pittsburgh, Pa.). All commercial materials were used as received.

Example 2

Polymer Synthesis

In the Examples that follow, three different α,ω-dimethylvinylsilyl-terminated terpolysiloxanes (A, B and C of Reaction Scheme 1) were used as base polymers for paste preparations. The base polymers each included 0.3 mol % of methylvinylsiloxy-("MeViS") repeat units, varying amounts (y) of crystallization disrupting diphenylsiloxy- ("DiPhS"; 3.6 mol % in Polymer A), methylphenylsiloxy- ("MePhS"; 4.4 mol % in Polymer B), or diethylsiloxy-("DiEtS"; 7 mol % in Polymer C), and the rest (i.e., 93-96 mol %, respectively) dimethylsiloxy-("DiMeS") repeat units. All three terpolymers were prepared by anionic ring opening/equilibration polymerization of the corresponding mixtures of cyclosiloxanes, as shown in Reaction Scheme 1 and as described previously by:
  iv. A. Zlatanic, D. Radojcic, X. Wan, J. M Messman, P. R. Dvornic, Suppression of Crystallization in Polydimethylsiloxanes and Chain Branching in Their Phenyl-containing Copolymers, Macromol. 50 (2017) 3532-3543.
  v. A. Zlatanic, D. Radojcic, X. Wan, J. M. Messman, P. R. Dvornic, Monitoring of the Course of the Silanolate-Initiated Polymerization of Cyclic Siloxanes. A Mechanism for the Copolymerization of Dimethyl and Diphenyl Monomers, Macromol. 51 (2018) 895-905.
  vi. A. Zlatanic, D. Radojcic, X. Wan, J. M. Messman, D. E. Bowen, P. R. Dvornic, Dimethyl-Methylphenyl Copolysiloxanes by Dimethylsilanolate-Initiated Ring Opening Polymerization. Evidence for Linearity of the Resulting Polymer Structures. *J. Pol. Sci., Part A: Pol. Chem.* 57(10) (2019) 1122-1129, https://doi.org/1.002/pola.29367.

Each of (i)-(iii) above is incorporated by reference herein. Selected characteristics of these terpolysiloxanes are shown in Table 1.

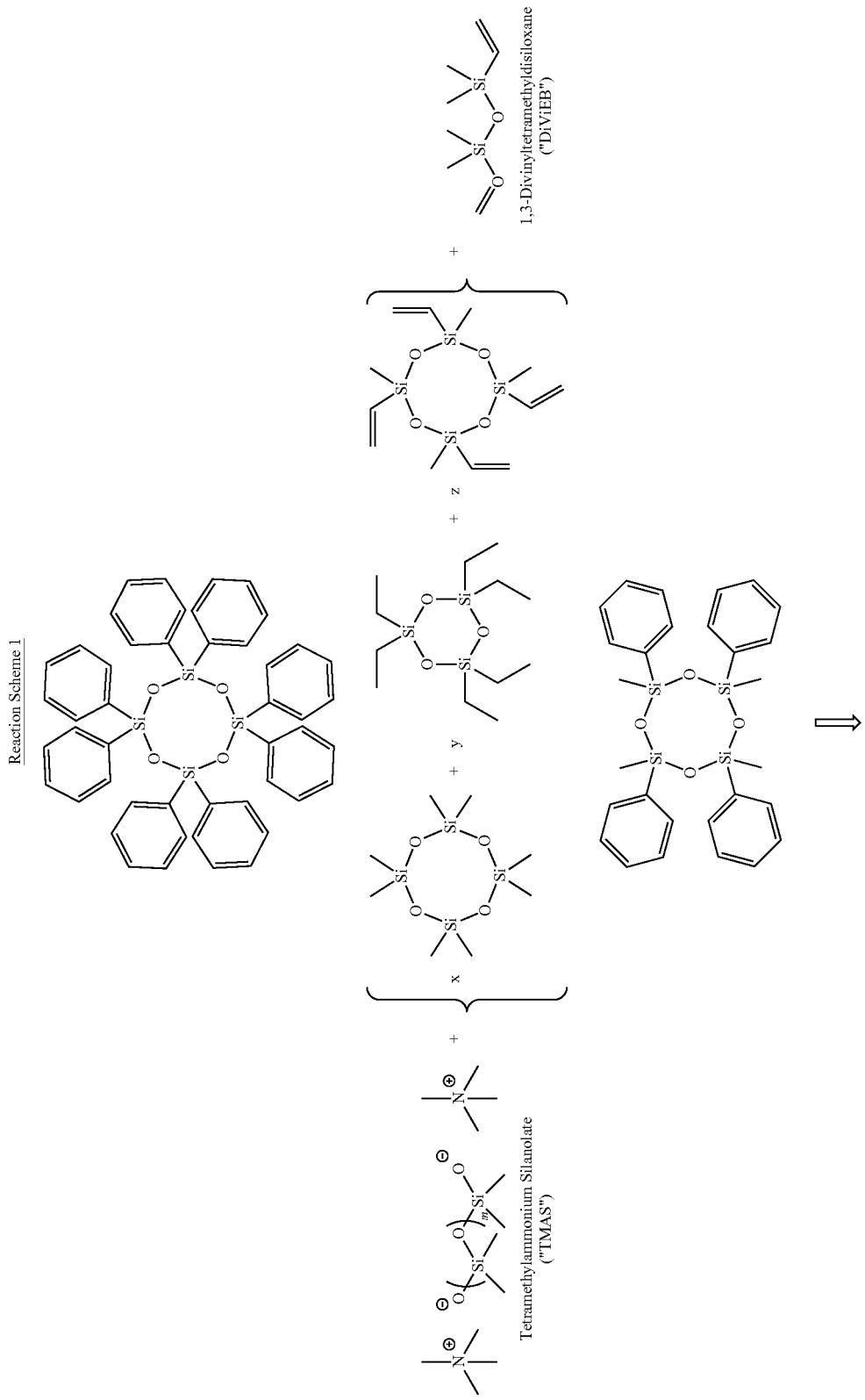

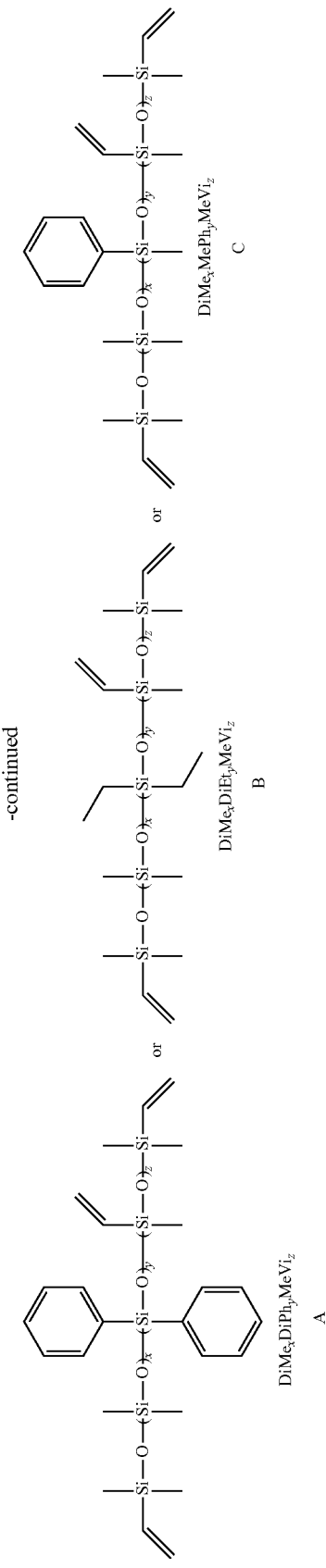

TABLE 1

Selected Characteristics of Terpolysiloxanes A, B, and C of Reaction Scheme 1.

| Polymer ID | $M_t^a$ | $DP_t$ | $IV_t^b$, gI$_2$/100, g | $IV_{exp}^b$, gI$_2$/100, g | $f_{Vi}^c$ | $\eta^d$ at 25° C., Pa·s | SEC-MALS-Visc. dn/dc, mL/g | $M_w$ | $M_n$ |
|---|---|---|---|---|---|---|---|---|---|
| A - DiMeDiPh$_{3.6}$MeVi | 38,000 | 480 | 2.3 | 2.4 | 3.3 | 6.8 | −0.073 | 57,373 | 35,149 |
| B - DiMeMePh$_{4.4}$MeVi | 30,500 | 400 | 3.0 | 3.5 | 3.6 | 4.7 | −0.079 | 46,321 | 29,283 |
| C - DiMeDiEt$_7$MeVi | 36,900 | 480 | 2.4 | 2.6 | 2.9 | 4.2 | −0.094 | 45,636 | 28,355 |

| Polymer ID | SEC-MALS-Visc. $M_p$ | PDI$^e$ | $[\eta]^f$, mL/g | $R_h$, nm | MHS Parameters a | K, mL/g | Comonomer content Feed, mol % | Polymer (by $^1$HNMR), mol % |
|---|---|---|---|---|---|---|---|---|
| A-DiMeDiPh$_{3.6}$MeVi | 54,338 | 1.63 | 29.2 | 6.2 | 0.682 | 0.0178 | 3.6 | 4.0 |
| B-DiMeMePh$_{4.4}$MeVi | 46,432 | 1.58 | 24.8 | 5.5 | 0.688 | 0.0160 | 4.4 | 4.7 |
| C-DiMeDiPh$_7$MeVi | 44,900 | 1.61 | 25.9 | 5.5 | 0.673 | 0.0203 | 7.0 | 6.7 |

$^a$$M_t$: targeted molecular weight
$^b$$IV_t$ and $IV_{exp}$: iodine values theoretical and experimental, respectively
$^c$$f_{Vi}$: Vi functionality of polysiloxane: $f_{Vi} = M_n/EW_{Vi}$. The weight of Vi equivalent: $EW_{Vi}$ = MW(I$_2$) × 100/IV = 25,380/IV
$^d$η: dynamic viscosity of isolated polymer as determined by cone and plate viscometry
$^e$PDI: polydispersity index; PDI = $M_w/M_n$
$^f$[η]: intrinsic viscosity as determined by Visco-Star II online detector

Example 3

Paste Preparation

All pastes were compounded using a FlackTek DAC 150.1 FV Speedfixer™, a dual asymmetric centrifugal mixer, from FlackTek Inc., Landrum, S.C. In a typical preparation, terpolymer base, crosslinker, thixotropic additive and catalyst-inhibitor mutual solution were added to a mixing cup, followed by successive additions of trimethylsilylated AEROSIL® R 812 S fumed silica filler in small portions. After addition of each filler increment the pastes were mixed for 20 sec at 3,000 rpm until the total desired amount of filler was added. Once the final portion of filler was added, the pastes were mixed a final time for 1 min at 3,000 rpm. 50 g sample batches were compounded with filler in 10, 15, and 18 wt. % of samples, respectively.

Unless otherwise stated below, the following quantities were utilized:

Thixotropic additive: 1.0% by weight (based on total compositional weight);
Crosslinker: supplied at 1:1 [Si—H]:[Si-Vi];
Catalyst: 0.0125% by weight (based on total compositional weight); and
Inhibitor: 0.25:1 ratio of DEAD:catalyst.

Example 4

Determination of Rheological Properties

Rheological studies of the pastes as described in Examples 5-7 were performed using an AR 2000ex rotational rheometer (TA Instruments, New Castle, Del.) with a 40 mm 0° (parallel) plate geometry at a 1 mm geometry gap, and all compounded pastes were subjected to oscillatory and steady flow shear tests at 25° C. Samples were spread evenly onto the center of the bottom (Peltier) plate, after which the upper plate was lowered to the established geometry gap to ensure the paste made complete contact with surfaces of both plates. Excess material that seeped beyond the diameter of the top plate was scraped off and discarded. Oscillatory shear tests were performed at constant frequency of 1 sec-, with the stress sweep ranging from 3 to 5,000 Pa. The yield stresses of the pastes were determined from oscillatory stress values obtained from: (a) intersections of the storage (G') and loss (G") moduli, and (b) from 90% of the G' plateau value. Steady state shear tests were performed in two stages with reciprocal linear shear ramps, the first ranging from 0.01 sec$^{-1}$ to 10 sec$^{-1}$ and the second from 10 sec$^{-1}$ to 0.01 sec$^{-1}$. Thixotropy of the pastes was determined from the shear stress vs. shear rate plots obtained from the steady state shear tests by the presence of a hysteresis loop characteristic for thixotropic behavior. In some instances (as noted in the Figures) comparisons were made a commercially available thixotropic material sold by Dow Corning under the name Dowsil™ SE 1700.

Example 5

Effects of a Thixotropic Additive on Pastes

In order to achieve the desired thixotropic behavior of pastes, a series of preliminary tests was performed to evaluate the effectiveness of thixotropic additive, BLUESIL™ THIXO ADD 22646 (from Elkem Silicones). This thixotropic additive is a comb-like copolymer (estimated $M_n$ of about 45,000) having a polydimethylsiloxane main chain backbone and poly(ethyl ether-co-propyl ether) pendant chains ending in either carbinol or methylether end-groups.

Figure 2:
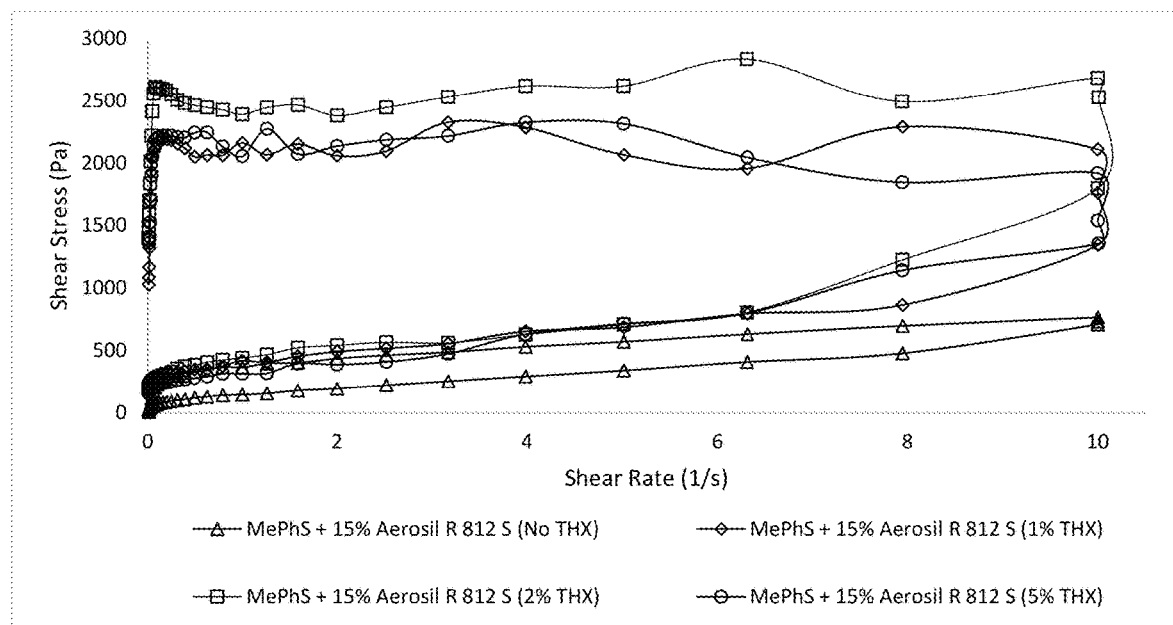
FIG. 2 is a graph depicting the steady shear of pastes containing 15 wt. % AEROSIL® R 812 S in MePhS-containing terpolymer (B) and varying amounts of BLUESIL™ THIXO ADD 22646 ("THX") as described in Example 5.

Formulations containing 15 wt. % of trimethylsilylated fumed silica filler (AEROSIL® R 812 S, Evonik Industries), and 0, 1, 2 or 5 wt. % of BLUESIL™ THIXO ADD 22646 relative to the terpolymer base were compounded. The results obtained for pastes prepared from MePhS-containing terpolymer (B) are shown in FIGS. 1 and 2.

It can be seen from these data that the addition of only 1 wt. % BLUESIL™ THIXO ADD 22646 was sufficient to result in: (a) a significant increase in storage modulus, from about 60 Pa (terpolymer and filler only) to approximately 100,000 Pa; (b) a significant increase in yield stress, from about 65 Pa to 1,900 Pa at 90% of G' plateau value; and (c) a change from almost shear-thinning material to one with a broad thixotropic hysteresis loop. Interestingly, further increases in BLUESIL™ THIXO ADD 22646 content to 2 and 5 wt. %, respectively, did not have a significant effect on the rheological properties of these pastes. As a consequence, 1 wt. % content was chosen as the optimal amount of BLUESIL™ THIXO ADD 22646 for further paste formulations.

Example 6

Effects of Polymer Composition on Pastes

Figure 3:
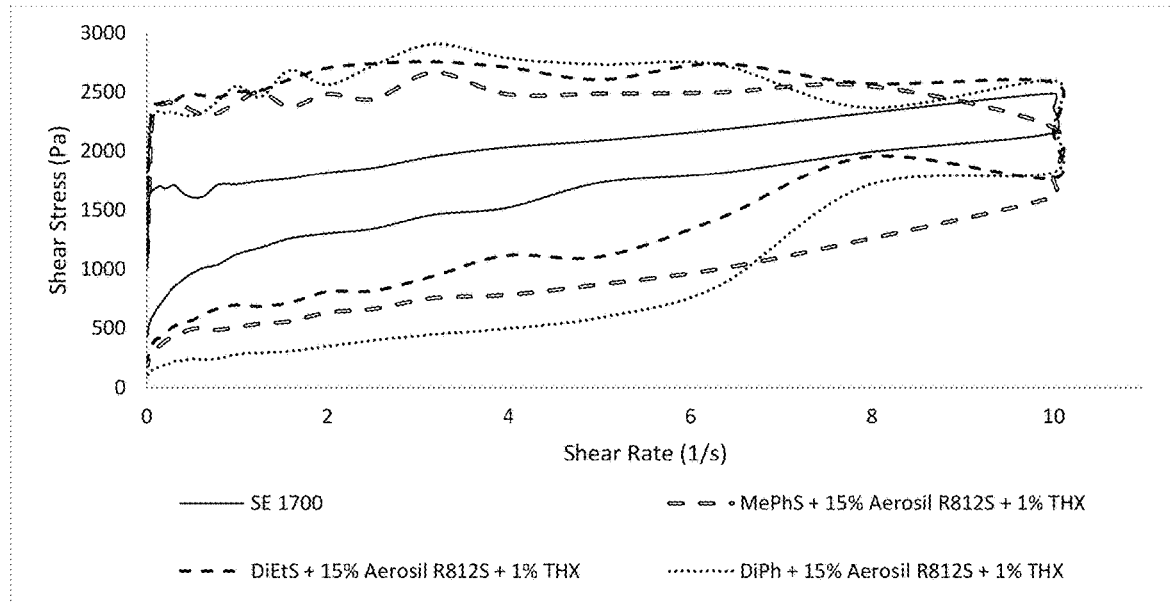
FIG. 3 is a graph showing the steady shear of pastes prepared from DiPhS-, MePhS- and DiEtS-containing terpolymers (A, B, and C) at day 0 with 15 wt. % AEROSIL® R 812 S and 1 wt. % BLUESIL™ THIXO ADD 22646 ("THX") as compared to a commercially available product ("SE 1700") as described in Example 6.
Figure 4:
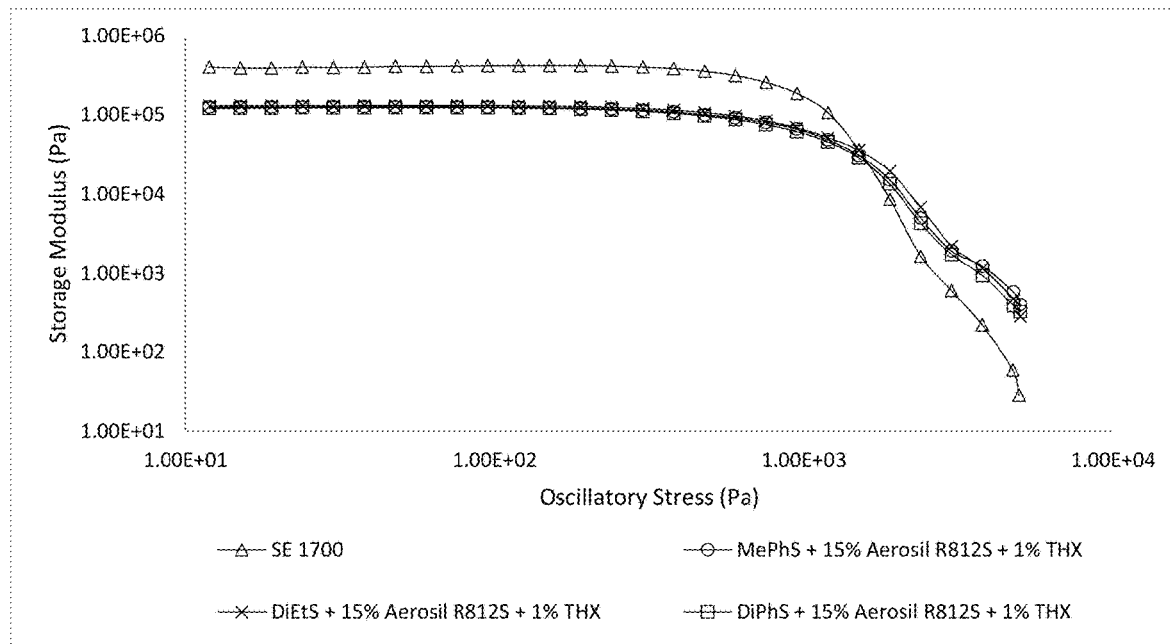
FIG. 4 is a graph of the oscillatory shear of pastes prepared from DiPhS-, MePhS- and DiEtS-containing terpolymers (A, B, and C) at day 0 with 15 wt. % AEROSIL® R 812 S and 1 wt. % BLUESIL™ THIXO ADD 22646 ("THX") as compared to a commercially available product ("SE 1700") as described in Example 6.
Figure 5A:
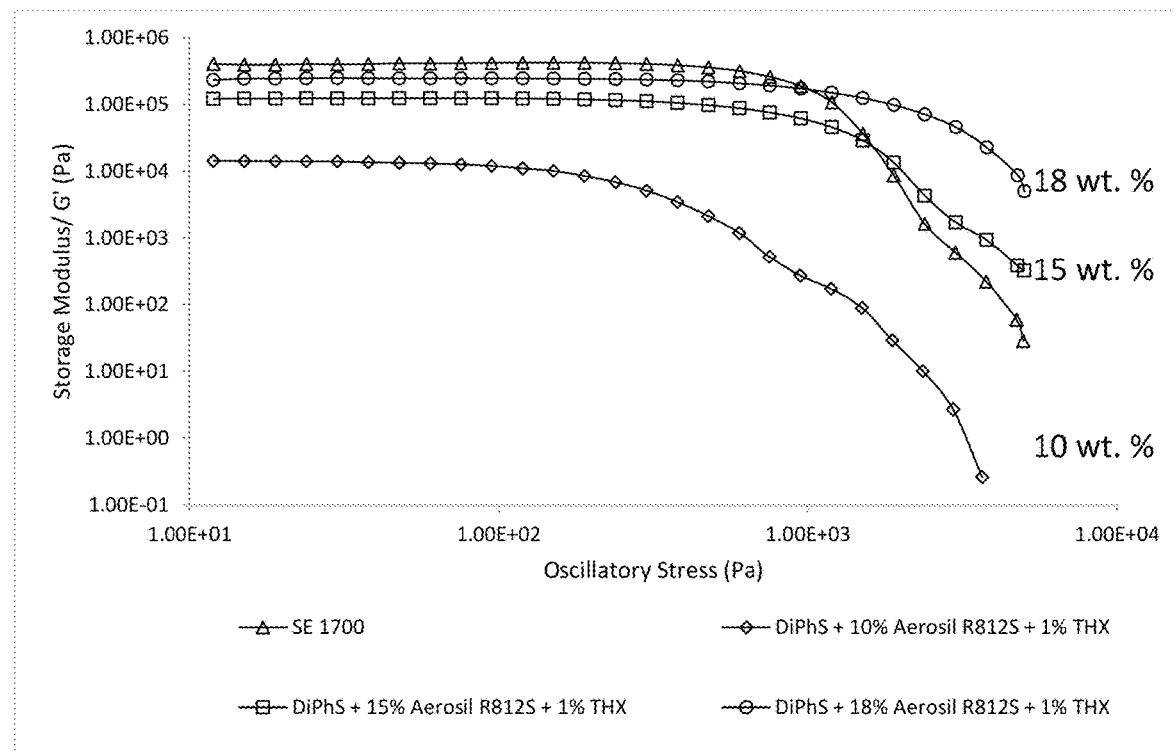
FIG. 5(A) is a graph depicting the oscillatory shear of pastes prepared from DiPhS-containing terpolymer (A) at day 0 with 10, 15, and 18 wt. % of AEROSIL® R 812 S and 1 wt. % of BLUESIL™ THIXO ADD 22646 ("THX") as compared to a commercially available product ("SE 1700") as described in Example 7.
Figure 5B:
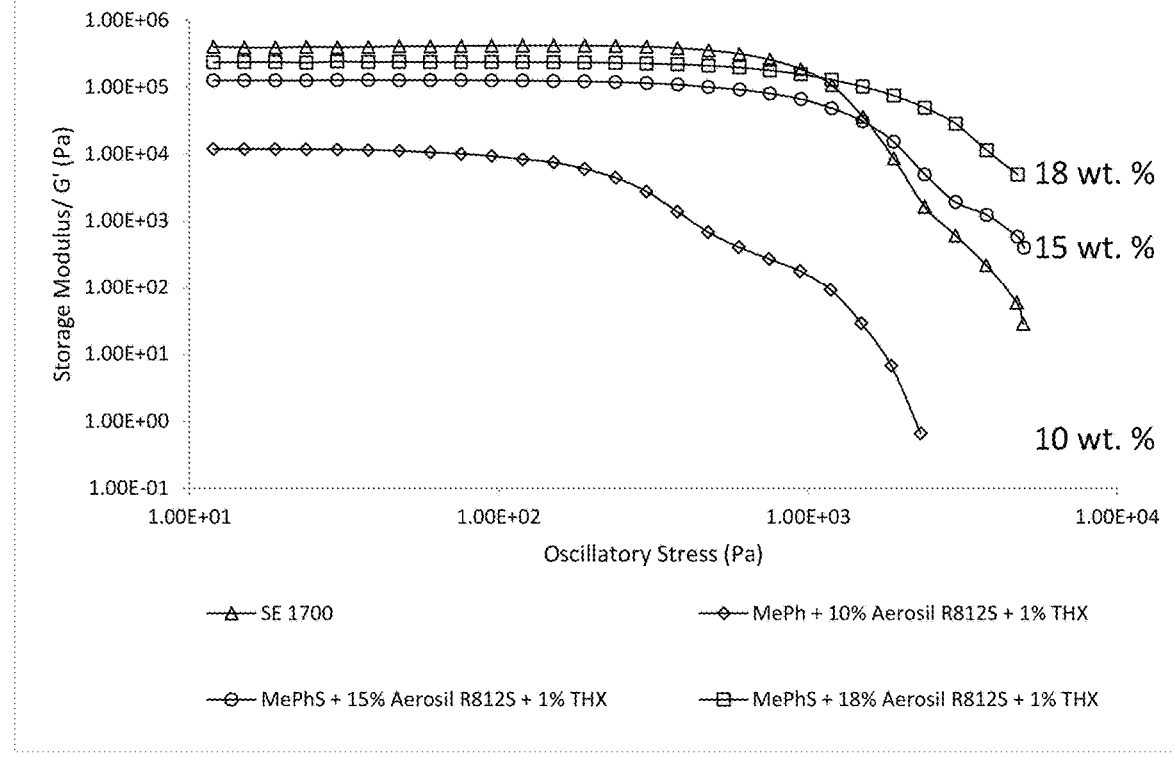
FIG. 5(B) is a graph showing the oscillatory shear of "all-in-one" pastes prepared from MePhS-containing terpolymer (B) at day 0 with 10, 15, and 18 wt. % of AEROSIL® R 812 S and 1 wt. % of BLUESIL™ THIXO ADD 22646 ("THX") as compared to a commercially available product ("SE 1700") as described in Example 7.
Figure 5C:
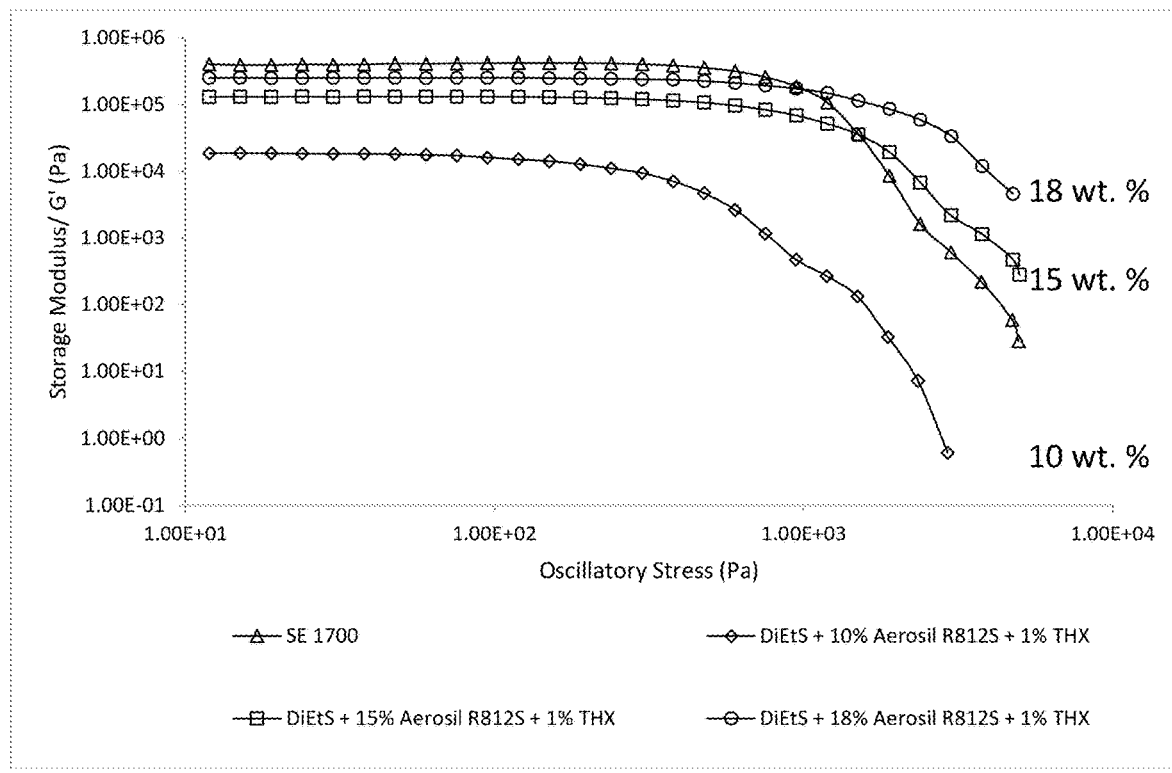
FIG. 5(C) is graph of the oscillatory shear of pastes prepared from DiEtS-containing terpolymer (C) at day 0 with 10, 15, and 18 wt. % of AEROSIL® R 812 S and 1 wt. % of BLUESIL™ THIXO ADD 22646 ("THX") as compared to a commercially available product ("SE 1700") as described in Example 7.
Figure 6A:
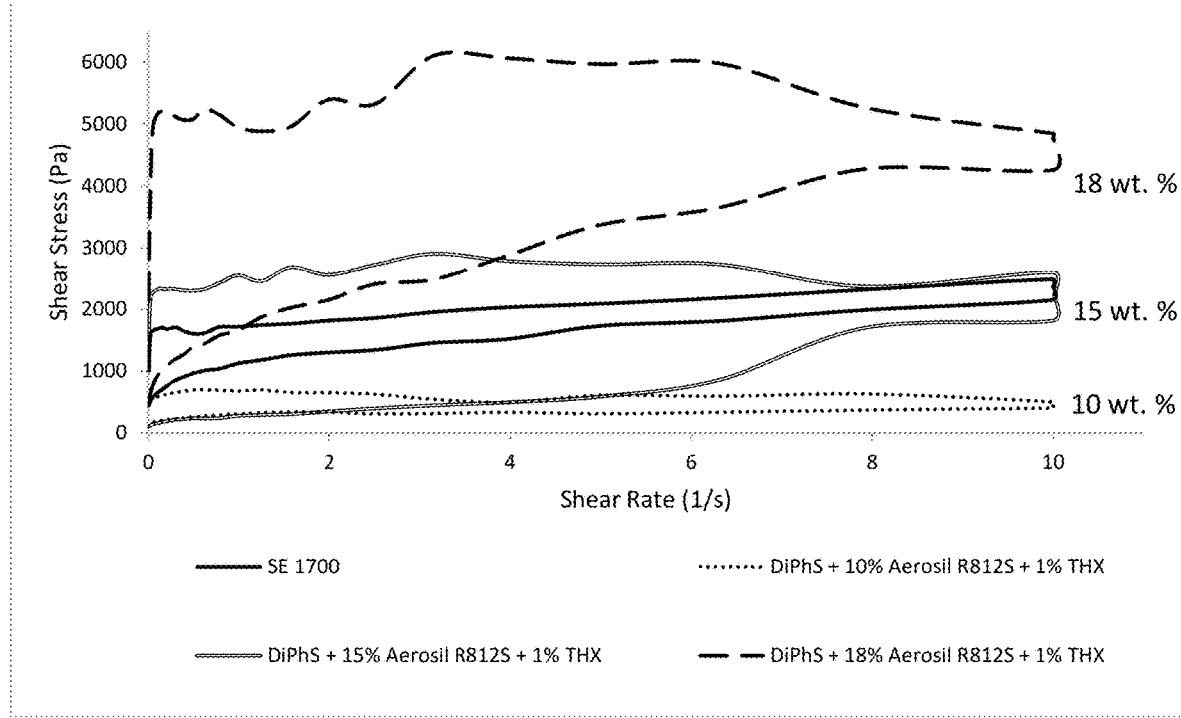
FIG. 6(A) is a graph depicting the steady shear of pastes prepared from DiPhS-containing terpolymer (A) at day 0 with 10, 15, and 18 wt. % AEROSIL® R 812 S and 1 wt. % BLUESIL™ THIXO ADD 22646 ("THX") as compared to a commercially available product ("SE 1700") as described in Example 7.
Figure 6B:
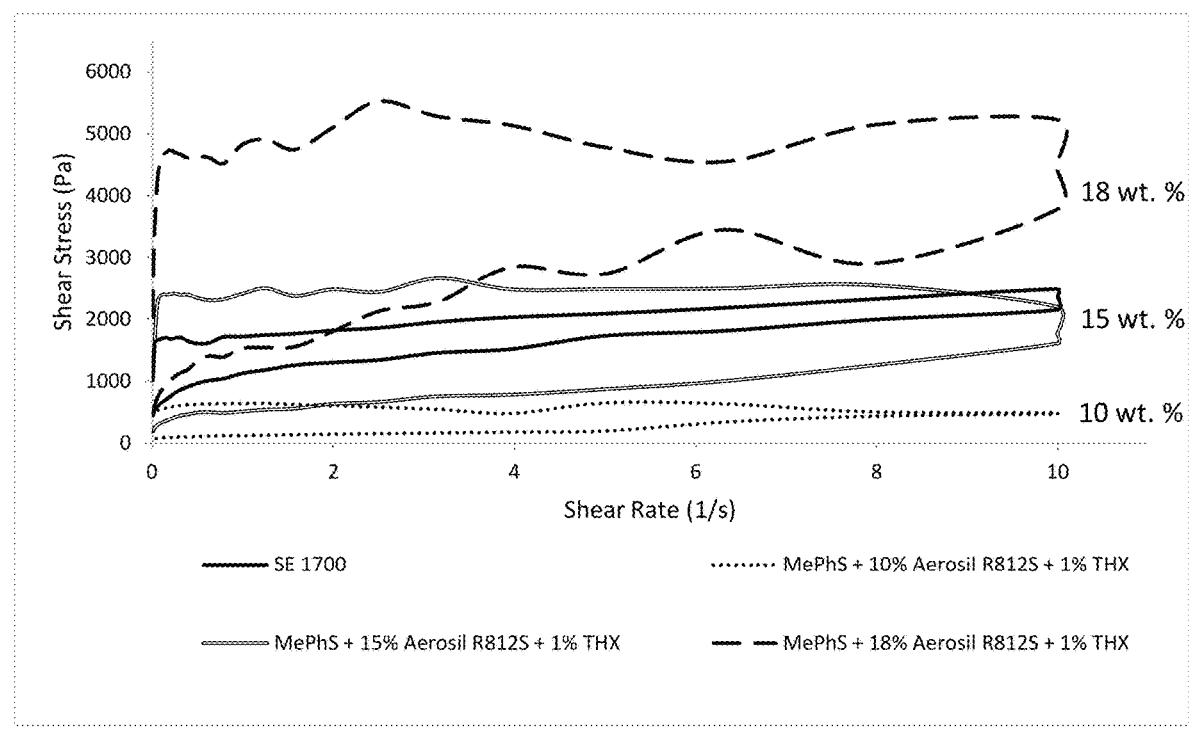
FIG. 6(B) is a graph showing the steady shear of pastes prepared from MePhS-containing terpolymer (B) at day 0 with 10, 15, and 18 wt. % AEROSIL® R 812 S and 1 wt. % BLUESIL™ THIXO ADD 22646 ("THX") as compared to a commercially available product ("SE 1700") as described in Example 7.
Figure 6C:
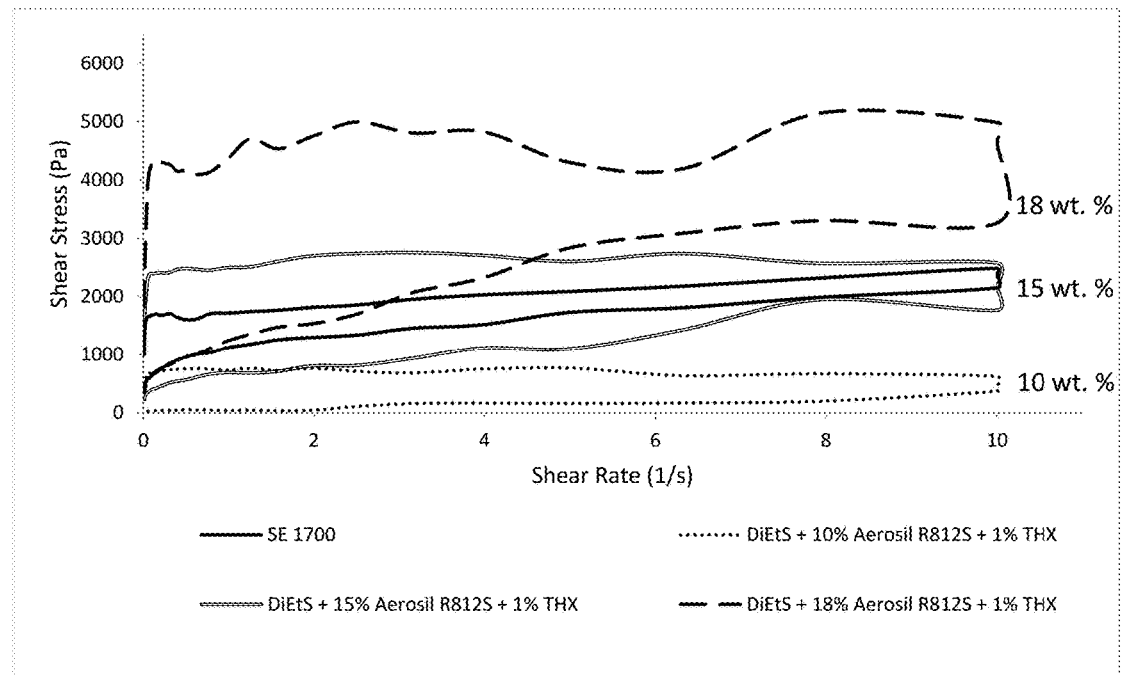
FIG. 6(C) is a graph of the steady shear of pastes prepared from DiEtS-containing terpolymer (C) at day 0 with 10, 15, and 18 wt. % AEROSIL® R 812 S and 1 wt. % BLUESIL™ THIXO ADD 22646 ("THX") as compared to a commercially available product ("SE 1700") as described in Example 7.

The flow behavior of pastes prepared from DiPhS-, MePhS- and DiEtS-containing terpolysiloxanes (A, B and C of Reaction Scheme 1, respectively) with 1 wt. % BLUESIL™ THIXO ADD 22646 and 15 wt. % AEROSIL® R 812 S filler are shown in FIGS. 3 and 4. This behavior remained unchanged with time, as indicated by repeated weekly tests over a one-month period of storage at room temperature.

It can be seen from these FIGS. 3 and 4 that the change in terpolymer type (i.e., the change in crystallization disrupting repeat units in these polymer compositions) had no effect on rheological properties of their pastes, which all showed very similar yield stresses of 300-350 Pa (if determined at 90% G' plateau value), or 2,200-2,400 Pa (if G'/G" intersect was used).

Example 7

Effects of Filler Concentration on Pastes

The relative content of trimethylsilylated fumed silica filler AEROSIL® R 812 S was found to exert a substantial effect. FIGS. 5(A)-(C) and 6(A)-(C) show results of oscillatory and steady shear tests conducted on "all-in-one" pastes containing 10, 15, or 18 wt. % of this filler, respectively.

The thixotropic behavior of pastes became more pronounced with increasing amount of filler, producing hysteresis loops with greater areas at higher levels of shear stress (see FIG. 6), but also enabling fine-tuning of their moduli by adding precise quantities of filler (see FIG. 5). Thus, the yield stresses could be very precisely "dialed in" from 60-85 Pa, to 300-350 Pa, to 475-600 Pa (using the 90% G' plateau value) or from 300-750 Pa, to 2,200-2,400 Pa, to 3,800-4,000 Pa (using the G'/G" intersect), by increasing the filler content from 10 to 15 to 18 wt. %, respectively (see Table 2).

TABLE 2

Yield stress values of pastes with varying levels of filler.

| Paste composition | Yield stress at G'/G" intersect, Pa | Yield stress at 90% G', Pa |
|---|---|---|
| SE 1700 | 1,400 | 430 |
| A + 10% AS + 1% THX | 540 | 75 |
| B + 10% AS + 1% THX | 380 | 60 |
| C + 10% AS + 1% THX | 750 | 85 |
| A + 15% AS + 1% THX | 2,200 | 300 |
| B + 15% AS + 1% THX | 2,200 | 300 |
| C + 15% AS + 1% THX | 2,400 | 350 |
| A + 18% AS + 1% THX | 4,000 | 600 |
| B + 18% AS + 1% THX | 3,800 | 475 |
| C + 18% AS + 1% THX | 3,800 | 475 |

All % values are in wt. % relative to the entire mass of the composition.
AS: AEROSIL ® R 812S
THX: BLUESIL ™ THIXO ADD 22646

Example 8

UV-Activated Crosslinking and Shelf-Life Stability

UV-activated crosslinking by hydrosilylation of terpolysiloxanes A, B, and C used for preparation of the "all-in-one" pastes is depicted in Reaction Scheme 2.

Reaction Scheme 2

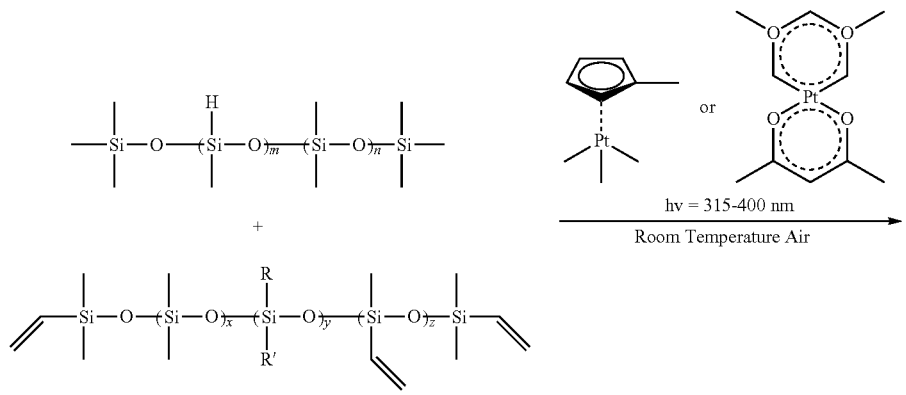

-continued

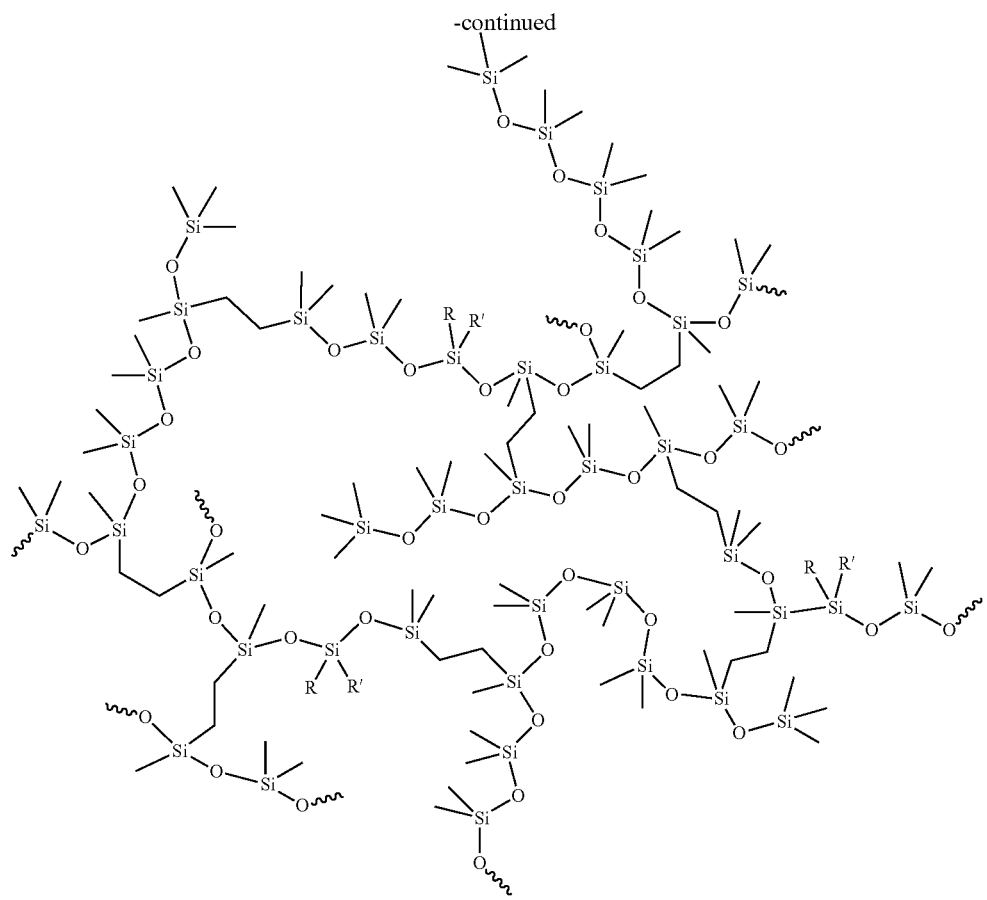

A dimethylsiloxy-co-methylhydridosiloxy copolymer (Gelest, Inc. HMS-151) containing declared 15-18 mol % Si—H side groups per molecule (average Si—H functionality of 4) was used as a crosslinker. Platinum acetylacetonate, Pt(AcAc)$_2$ and trimethyl(methylcyclopentadienyl)platinum (IV) ("MeCpPtMe$_3$") were used as UV-activated hydrosilylation catalysts, and diethyl azodicarboxylate ("DEAD") was used as a catalysis inhibitor in the absence of UV irradiation. The DEAD and catalyst were supplied in a preliminary series of experiments at a molar ratio [DEAD]:[catalyst] of 0.25:1. It was verified that upon addition of crosslinker and catalyst/inhibitor, the overall rheology of the resulting "all-in-one" pastes did not change with respect to the results presented in the previous sections.

The stabilities of pastes were evaluated in darkness and in laboratory light (i.e., exposed daily to standard laboratory light on a benchtop), and their propensity to crosslink was evaluated under a 400 W, irradiance at 3"=115 mW/cm$^2$, UV light by monitoring the onset of gelation as the time when paste tackiness disappeared. The results obtained for pastes from terpolymers A, B, and C at different filler contents (10, 15, or 18 wt. % AEROSIL® R 812 S), 1 wt. % BLUESIL™ THIXO ADD 22646, and 125 ppm Pt(AcAc)$_2$ are shown in Table 3.

TABLE 3

UV-Activated Crosslinking and Shelf Stability of Pastes.

| | 10 wt. % Filler | | | 15 wt. % Filler | | | 18 wt. % Filler | | |
|---|---|---|---|---|---|---|---|---|---|
| | A | B | C | A | B | C | A | B | C |
| 400 W UV Lamp (sec) | 90 | 90 | 95 | 90 | 90 | 120 | 110 | 115 | 140 |
| Daylight (days) | | 10 | | | 6 | | | 5 | |
| Dark (days) | | >40 | | | ≈30 | | | ≈30 | |

Table 3 shows that pastes made from DiPhS- and MePhS-containing terpolymers (A and B, respectively) crosslinked slightly faster under UV irradiation with increasing filler content (from about 90 sec at 10 and 15 wt. % filler to about 110-115 sec at 18 wt. %) than the pastes from DiEtS-containing terpolymer (C), for which the crosslinking times increased from 95 to 120 to 140 sec for the same amounts of filler, respectively. The shelf-life stabilities of all pastes, however, displayed similar trends of behavior in both dark and in laboratory light, seemingly diminishing as the amount of filler was increased, although no effect of polymer composition on these properties could be specifically deciphered.

Effects of catalyst concentration and [DEAD]:[catalyst] ratio on the rate of crosslinking under UV irradiation and on shelf-life stabilities in daylight and in the dark were then evaluated in more detail on pastes from MePhS-containing terpolymer C having 15 wt. % AEROSIL® R 812 S and 1 wt. % BLUESIL™ THIXO ADD 22646. In this set of experiments, the [DEAD]:[catalyst] molar ratio was inverted to determine the change in UV-activated cure times and shelf stabilities when inhibitor was added in molar excess relative to catalyst. Pastes with [DEAD]:[catalyst] ratios of 1:1, 2:1, and 4:1 molar were examined, and the results obtained for crosslinking onsets under 400 W UV irradiation are shown in FIGS. 7 and 8.

Figure 7:
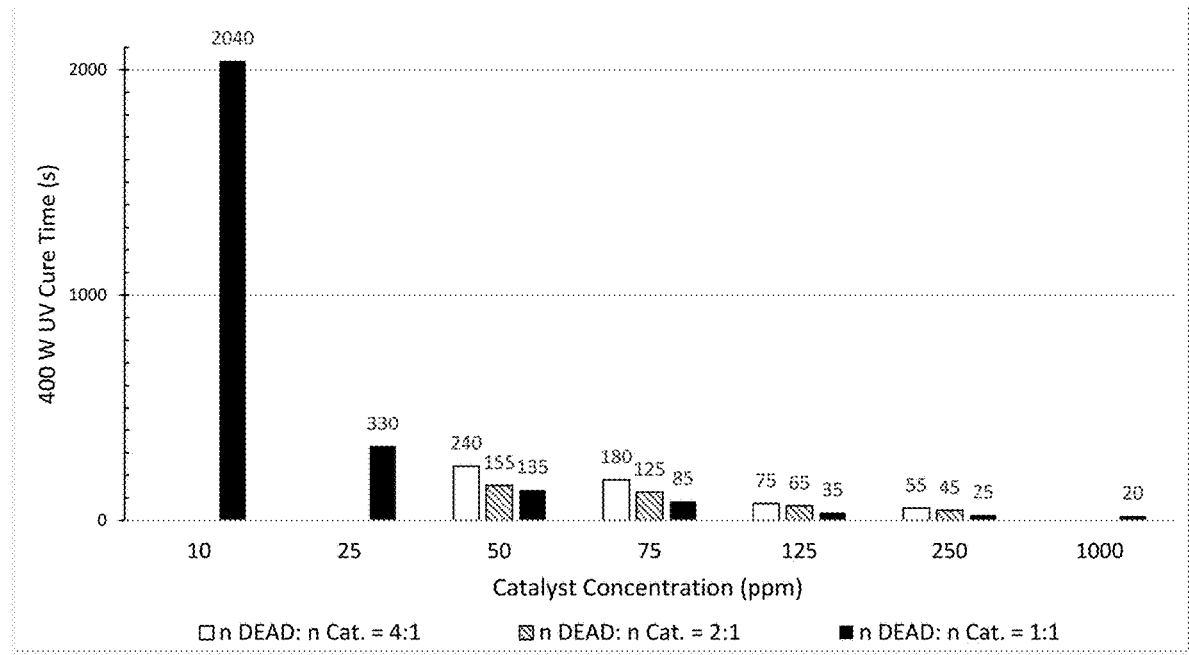
FIG. 7 is a graph comparing cure times of films from pastes made from MePhS-containing terpolymer (B) with 15 wt. % AEROSIL® R 812 S and 1 wt. % BLUESIL™ THIXO ADD 22646 as a function of $MeCpPtMe_3$ concentration and [DEAD]:[catalyst] ratio as described in Example 8.
Figure 8:
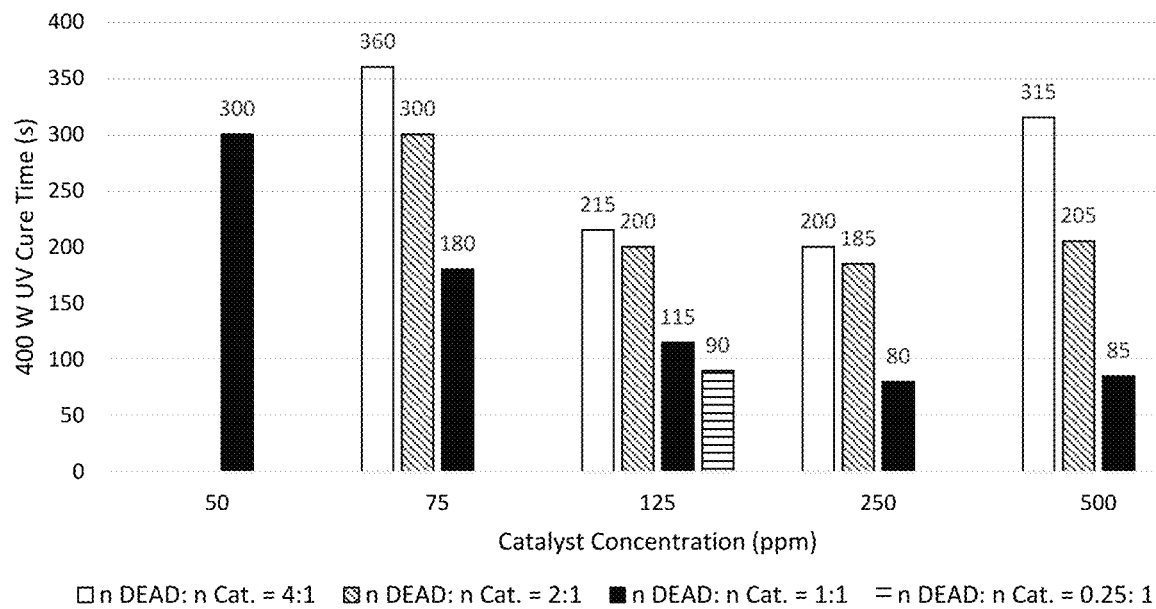
FIG. 8 is a graph comparing cure times of films from pastes made from MePhS-containing terpolymer (B) with 15 wt. % AEROSIL® R 812 S and 1 wt. % BLUESIL™ THIXO ADD 22646 as a function of $Pt(AcAc)_2$ concentration and [DEAD]:[catalyst] ratio as described in Example 8.

It can be seen from these FIGS. 7 and 8 that although both catalysts performed effectively, MeCpPtMe$_3$ had shorter cure times for these pastes than Pt(AcAc)$_2$. The fastest crosslinking times utilizing MeCpPtMe$_3$ were obtained for its 1:1 molar combination with DEAD, reaching to as low as 25 and 20 sec for the cases of 250 and 1,000 ppm catalyst concentrations, respectively. Most importantly, however, when the same pastes were kept in darkness or open to laboratory light on a bench top, they did not show any sign of crosslinking after 6 months and 6-9 days, respectively. In an extreme case (data not shown), the crosslinking time reached as short as 22 sec for 250 ppm catalyst concentration with no DEAD added. For this case, the corresponding shelf-life stability was 6 months in darkness, and 4 days on the bench top, respectively. Further extrapolation of this data also indicated that cure times shorter than 10 sec under the same experimental conditions with approximately 10,000 ppm catalyst and at [DEAD]:[catalyst]=1:1 molar should be achievable.

Example 9

Printing

Pastes were prepared from DiPhS-, MePhS-, and DiEtS-containing terpolysiloxanes (A, B and C of Reaction Scheme 1, respectively), following the procedure described in Example 3. Each paste was individually tested by loading into opaque 30 cc syringes and centrifuging for 10 minutes at 4,000 rpm for degassing prior to DIW printing. The shear thinning behavior of these pastes allowed for pneumatic or volumetric dispensing at a feature size (internal nozzle diameter) of 250 microns without issue. The samples were printed using a Nordson Ultimus V pneumatic dispenser for extrusion at ~65 psi pressure matched with a print speed of ~15 mm/s to achieve the proper bead diameter. Crosslinking was carried out in a UV chamber (Fusion UV Systems Series 300).

Figure 9A:
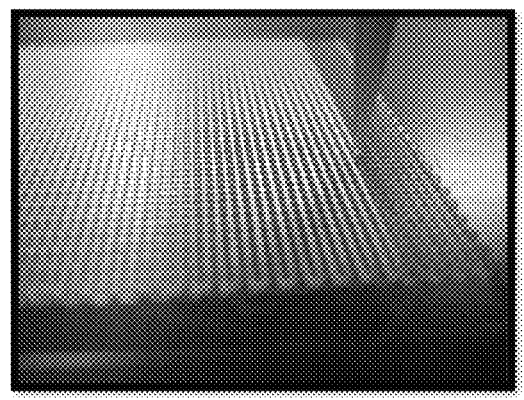
FIG. 9(A) is a photograph of a sample during the DIW printing process described in Example 9.
Figure 9B:
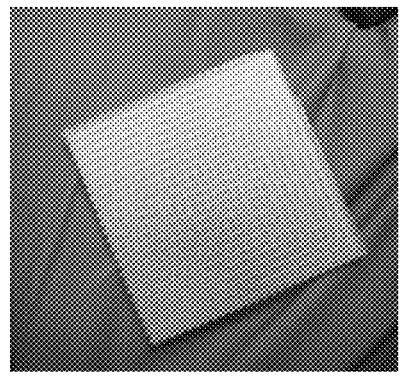
FIG. 9(B) is a photograph of the silicone rubber pad printed in Example 9.
Figure 9C:
FIG. 9(C) demonstrates the flexibility of the rubber pad shown in FIG. 9(B)
Figure 9D:
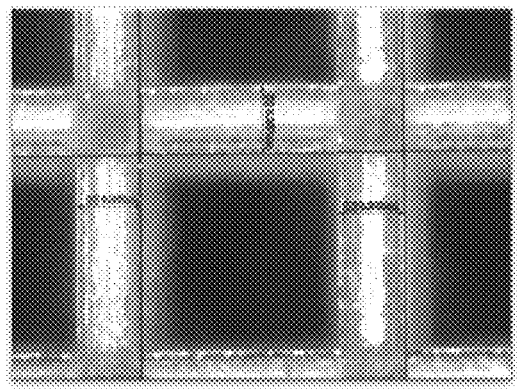
FIG. 9(D) is a cross-sectional view (120×) of the printed rubber pad of FIG. 9(C).

The thixotropy of the pastes was exemplified by excellent shape retention following extrusion with consistent bead diameters observed, with all samples performing well. FIG. 9(A) shows a snapshot of a MePhS-containing terpolysiloxane sample during this DIW printing process. FIG. 9(B) is a photograph of a silicone rubber pad printed in this Example, while FIG. 9(C) demonstrates the flexibility of that printed rubber pad. Finally, FIG. 9(D) is a cross-sectional view of the printed rubber pad at 120× magnification, which verifies a consistent bead diameter was achieved. The as-printed samples held their respective shapes throughout each build prior to crosslinking via UV chamber.

We claim:

1. A method of forming a three-dimensional structure, said method comprising one or more of the following:
   (i) curing a first composition to form a first layer, wherein said first composition was entirely formed at least 3 days prior to said curing (i) and comprises:
      at least 50% by weight of a polymer that comprises the following monomers:

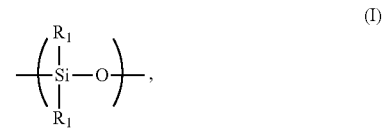

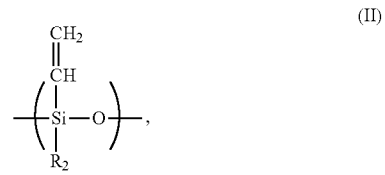

and
a crystallization disruptor monomer comprising:

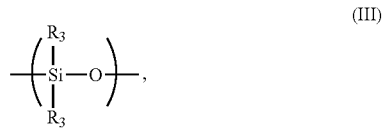

where:
  each R$_1$ can be the same or different and is chosen from C$_1$ to C$_6$ alkyls and C$_1$ to C$_6$ fluoroalkyls;
  R$_2$ is chosen from C$_1$ to C$_6$ alkyls;
  each R$_3$ can be the same or different and is chosen from phenyl, C$_1$ to C$_6$ alkyls, and C$_1$ to C$_6$ fluoralkyls, wherein at least one R$_3$ is phenyl, ethyl, or a fluoroalkyl;
  the molar percentage of (I) in the polymer is from about 90% to about 98%;
  the molar percentage of (II) in the polymer is from about 0.1% to about 10%; and
  the molar percentage of (III) in the polymer is from about 2% to about 10%;
a hydrosilylation crosslinker;
a thixotropic additive;
a catalyst;
a catalyst inhibitor; and
a filler;
(ii) curing a second composition to form a second layer on said first layer, wherein said first and second compositions can be the same as or different from one another; and
(iii) repeating (ii) one or more times with further compositions that can be the same as the first composition or different from the first composition so as to form one or more additional layers, wherein (ii) or (iii) results in the formation of the three-dimensional structure.

2. The method of claim 1, wherein each R$_1$ is methyl, R$_2$ is methyl, and (III) is chosen from one or more of:

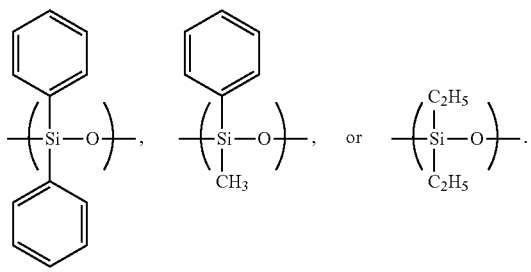

3. The method of claim 1, wherein:
said hydrosilylation crosslinker comprises a methylhydridosiloxane-dimethylsiloxane copolymer;
said catalyst comprises a platinum catalyst;
said catalyst inhibitor comprises diethyl azodicarboxylate;
said thixotropic additive comprises a polydimethylsiloxane main chain backbone and poly(ethyl ether-co-propyl ether) pendant chains ending in carbinol end groups, methylether end groups, or both; and
said filler comprises a silica filler.

4. The method of claim 1, wherein said curing (i) and curing (ii) comprise exposing said first and second compositions to electromagnetic radiation so as to crosslink said polymer and form cured first and second layers.

5. The method of claim 1, wherein said first layer is formed on a support.

6. The method of claim 1, wherein said curing (i) takes place at room temperature.

7. The method of claim 1, wherein said first composition is shelf-stable in a dark environment for at least 30 days and in ambient light for at least 4 days.

8. A three-dimensional structure formed according to the method of claim 1.

9. A method of forming a three-dimensional structure, said method comprising one or more of the following:
(i) curing a first composition to form a first layer, wherein said first composition was entirely formed at least 3 days prior to said curing (i) and comprises:
at least 50% by weight of a polymer that comprises the following monomers:

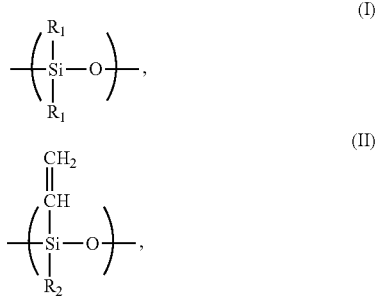

and
a crystallization disruptor monomer chosen from one or more of:

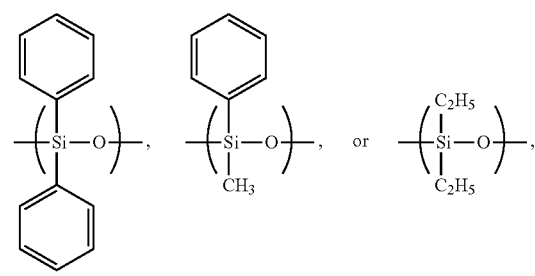

where:
each $R_1$ can be the same or different and is chosen from $C_1$ to $C_6$ alkyls and $C_1$ to $C_6$ fluoroalkyls;
$R_2$ is chosen from $C_1$ to $C_6$ alkyls;
the molar percentage of (I) in the polymer is from about 90% to about 98%;
the molar percentage of (II) in the polymer is from about 0.1% to about 10%; and
the molar percentage of (III) in the polymer is from about 2% to about 10%;
a hydrosilylation crosslinker;
a transition metal hydrosilylation catalyst; and
a thixotropic additive;
(ii) curing a second composition to form a second layer on said first layer, wherein said first and second compositions can be the same as or different from one another; and
(iii) repeating (ii) one or more times with further compositions that can be the same as the first composition or different from the first composition so as to form one or more additional layers, wherein (ii) or (iii) results in the formation of the three-dimensional structure.

10. The method of claim 9, wherein:
said hydrosilylation crosslinker comprises a methylhydridosiloxane-dimethylsiloxane copolymer;
said hydrosilylation catalyst comprises a platinum catalyst; and
said thixotropic additive comprises a polydimethylsiloxane main chain backbone and poly(ethyl ether-co-propyl ether) pendant chains ending in carbinol end groups, methylether end groups, or both.

11. The method of claim 9, wherein said curing (i) and curing (ii) comprise exposing said first and second compositions to electromagnetic radiation so as to crosslink said polymer and form cured first and second layers.

12. The method of claim 9, wherein said first layer is formed on a support.

13. The method of claim 9, wherein said curing (i) takes place at room temperature.

14. The method of claim 9, wherein said first composition is shelf-stable in a dark environment for at least 30 days and in ambient light for at least 4 days.

15. A three-dimensional structure formed according to the method of claim 9.

* * * * *